(12) United States Patent
Kawensky

(10) Patent No.: US 7,290,312 B2
(45) Date of Patent: Nov. 6, 2007

(54) DOUBLE SNAP

(76) Inventor: Stephen J. Kawensky, 905 Woodward Ave., McKees Rocks, PA (US) 15136

( * ) Notice: Subject to any disclaimer, the term of this patent is extended or adjusted under 35 U.S.C. 154(b) by 210 days.

(21) Appl. No.: 11/102,485

(22) Filed: Apr. 8, 2005

(65) Prior Publication Data

US 2006/0225255 A1  Oct. 12, 2006

(51) Int. Cl.
*A44B 21/00* (2006.01)
(52) U.S. Cl. .......................... 24/301; 24/378.1
(58) Field of Classification Search ............ 24/691, 24/298, 300–302, 369, 378.1, 379.1, 697.1, 24/DIG. 41; 248/499, 500, 222.11, 222.12
See application file for complete search history.

(56) References Cited

U.S. PATENT DOCUMENTS 533,373 A * 1/1895 Presby ...................... 24/369
5,042,113 A * 8/1991 Severson et al. ......... 24/16 PB
5,212,851 A * 5/1993 Wantanabe .................. 24/108
5,483,915 A * 1/1996 Clark .......................... 114/361

* cited by examiner

*Primary Examiner*—James R. Brittain
(74) *Attorney, Agent, or Firm*—James Ray & Assoc.

(57) ABSTRACT

An apparatus for providing at least one securing means in conjunction with one of a male and a female portion of a snap already in place, the apparatus comprises a first member having an opposite one a male and a female portion of a snap for engagement with such one of a male and a female portion of such snap already in place. There is an intermediate segment engageable with an inner part of such one of such male and female portion of the first member, the intermediate segment having a projection extending outwardly therefrom. There is a strap like connector having a first aperture in a first end engageable with the projection of the intermediate segment, the strap like connector extending outwardly therefrom and a second member having an opposite one of a male and a female portion of a snap as such first member, such second member secured to an end of the projection of the intermediate segment.

5 Claims, 3 Drawing Sheets

DOUBLE SNAP

FIELD OF THE INVENTION

The present invention relates, in general, to an apparatus, used in recreational boating, and more particularly, the present invention relates to an apparatus designed to secure a second snap to a snap used for another purpose.

BACKGROUND OF THE INVENTION

In recreational boating storage areas are at a premium since there is little wasted space on a boat. On many boats canvas covers are used which have female snaps on the cover which are secured to male snaps disposed on various sections of the boat; however, when the cover is snapped in place there is little space that can be used to hang items on the boat. Also when the cover is in place the cover is secured tightly and little air can pass between the boat and the cover. It would be desirable if a device were available which would permit dual usage of such things as the snaps which secure the cover.

SUMMARY OF THE INVENTION

In a first aspect the present invention provides an apparatus for providing at least one securing means in conjunction with one of a male and a female portion of a snap already in place, the apparatus comprises a first member having an opposite one a male and a female portion of a snap for engagement with such one of a male and a female portion of such snap already in place. There is an intermediate segment engageable with an inner part of such one of such male and female portion of the first member, the intermediate segment having a projection extending outwardly therefrom. There is a strap like connector having a first aperture in a first end engageable with the projection of the intermediate segment, the strap like connector extending outwardly therefrom and a second member having an opposite one of a male and a female portion of a snap as such first member, such second member secured to an end of the projection of the intermediate segment.

In another aspect there is provided an apparatus for providing at least one securing means in conjunction with a female portion of a snap already in place. The apparatus comprises a first male member for engagement with such female portion of such snap. There is an intermediate member engageable with an inner portion of the male member, the intermediate member having a projection extending outwardly therefrom. There is a strap like connector having a first end engageable with the projection of the intermediate member, the strap like connector extending outwardly therefrom and a second male member secured to an end of the projection of the intermediate member.

In yet another aspect there is provided an apparatus for providing at least one securing means in conjunction with a male portion of a snap already in place, the apparatus comprises a first female member for engagement with such male portion of such snap. There is an intermediate member engageable with an inner portion of the female member, the intermediate member having a projection extending outwardly therefrom. There is a strap like connector having a first end engageable with the projection of the intermediate member, the strap like connector extending outwardly therefrom and a second female member secured to an end of the projection of the intermediate member.

OBJECTS OF THE INVENTION

It is, therefore, one of the primary objects of the present invention to provide an apparatus that provides additional securing means in conjunction with a male snap presently in place.

Another object of the present invention is to provide an apparatus which can be used in recreational boating to provide another securing means to a snap used to secure a canvas cover.

Yet, another object of the present invention is to provide an apparatus which will provide an air gap between a canvas cover and a member that such cover is to be attached to.

In addition to the various objects and advantages of the invention which have been described in some specific detail above it should be noted that various other objects and advantages of the present invention will become more readily apparent to those persons who are skilled in the relevant art from the following more detailed description, particularly, when such description is taken in conjunction with the attached drawing Figures and with the appended claims.

Figure 1:
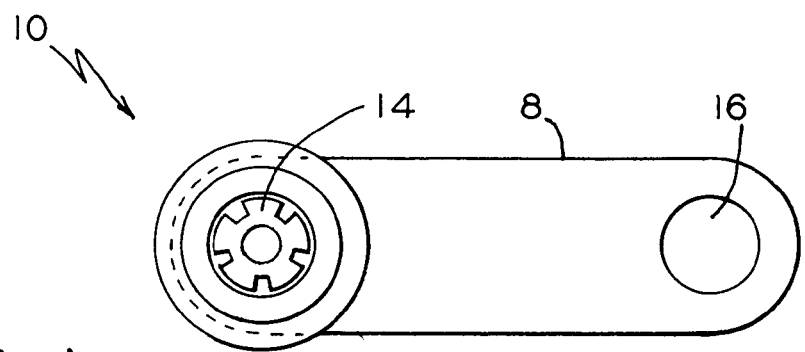
FIG. 1 is top view of the apparatus invention according to an embodiment of the invention.

BRIEF DESCRIPTION OF THE PRESENTLY PREFERRED AND VARIOUS ALTERNATIVE EMBODIMENTS OF THE INVENTION

Prior to proceeding to the more detailed description of the invention, it should be noted that identical components having identical functions have been designated with identical reference numerals throughout the several views illustrated in the drawings for the sake of clarity.

Figure 2:
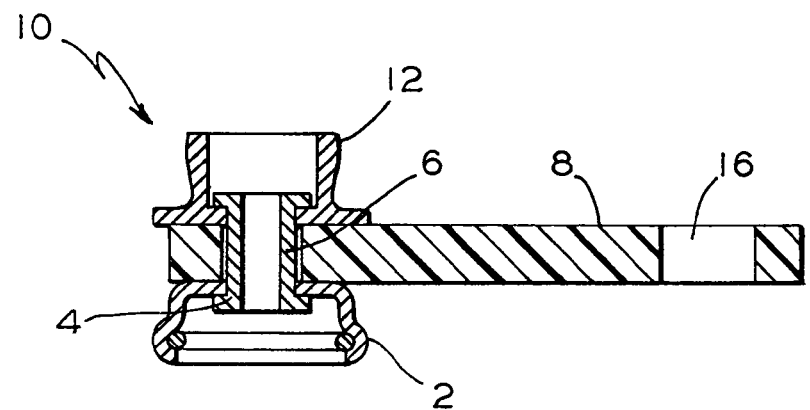
FIG. 2 is a cross sectional view of the apparatus shown in FIG. 1.
Figure 3:
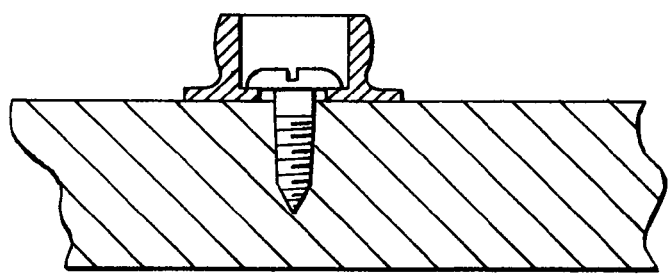
FIG. 3 is a prior art cross sectional view of a male portion of a snap secured to a predetermined member.
Figure 8:
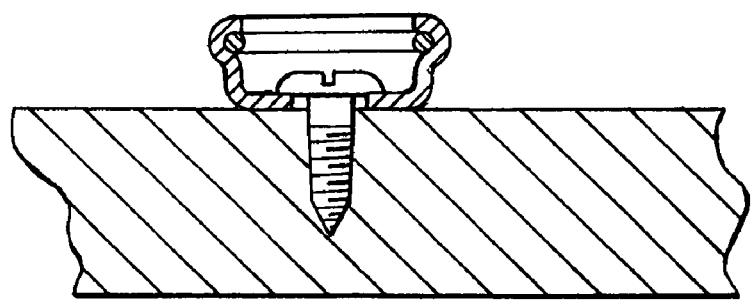
FIG. 8 is a prior art cross sectional view of a female portion of a snap secured to a predetermined member.

Now reference is made, more particularly, to drawing FIGS. 1 and 2. Illustrated therein is an apparatus, generally designated 10, according to an embodiment of the invention. Such apparatus is used in conjunction with either a male or a female portion of a snap that is already in place. The male portion of the snap is a prior art item as is evident in FIG. 3, while a female portion of the snap is a prior art item evident in FIG. 8.

Such apparatus 10 is used to provide an additional securing means to an item that is being used for a different application. One prime example would be in a recreational boat where male or female snaps are in place so as to secure a cover. The cover has the opposite male or female portion of the snap disposed therein. However, at the present time when the cover is snapped in place there is no place for additional storage or means for hanging small items to keep them handy and on a boat storage of items is vital because there is such little are that is available. Thus, space is at a premium.

The above example and much of the discussion relates to recreational boating; however, it is within the scope of the invention that such apparatus 10 could be used in various other applications and is not limited to recreational boating.

In a first aspect of the present invention there is provided an apparatus 10 for providing at least one securing means in conjunction with a male or a female portion of a snap already in place. The apparatus 10 comprises an opposite one of a female 2 or male member 12 for engagement with such male or female portion of such snap. There is an intermediate member 4 that is engageable with and secured to an inner portion of the female member 2 or the male member 12. The intermediate member 4 has a projection 6 that extends outwardly therefrom.

There is a strap like connector 8 which has a first end engageable with such projection 6 of the intermediate member 4. The strap like connector 8 extends outwardly therefrom. In a first embodiment the strap like connector 8 has a first aperture adjacent the first end that slips over the projection 6 of the intermediate member 4. An opposite one of a male member 12 or female member 2 is secured to an end of such projection 6 of the intermediate member 4. Such male member 12 or female member 2 is secured to the projection 6 of the intermediate member 4 by peening the end 14 of the projection 6. Thus, the strap like connector 8 is mounted to the projection 6 of intermediate member 4 before the male member 12 or female member 2 is added to the apparatus 10 since once the male member 12 or female member 2 is secured in place the apparatus 10 is fixed.

Figure 4:
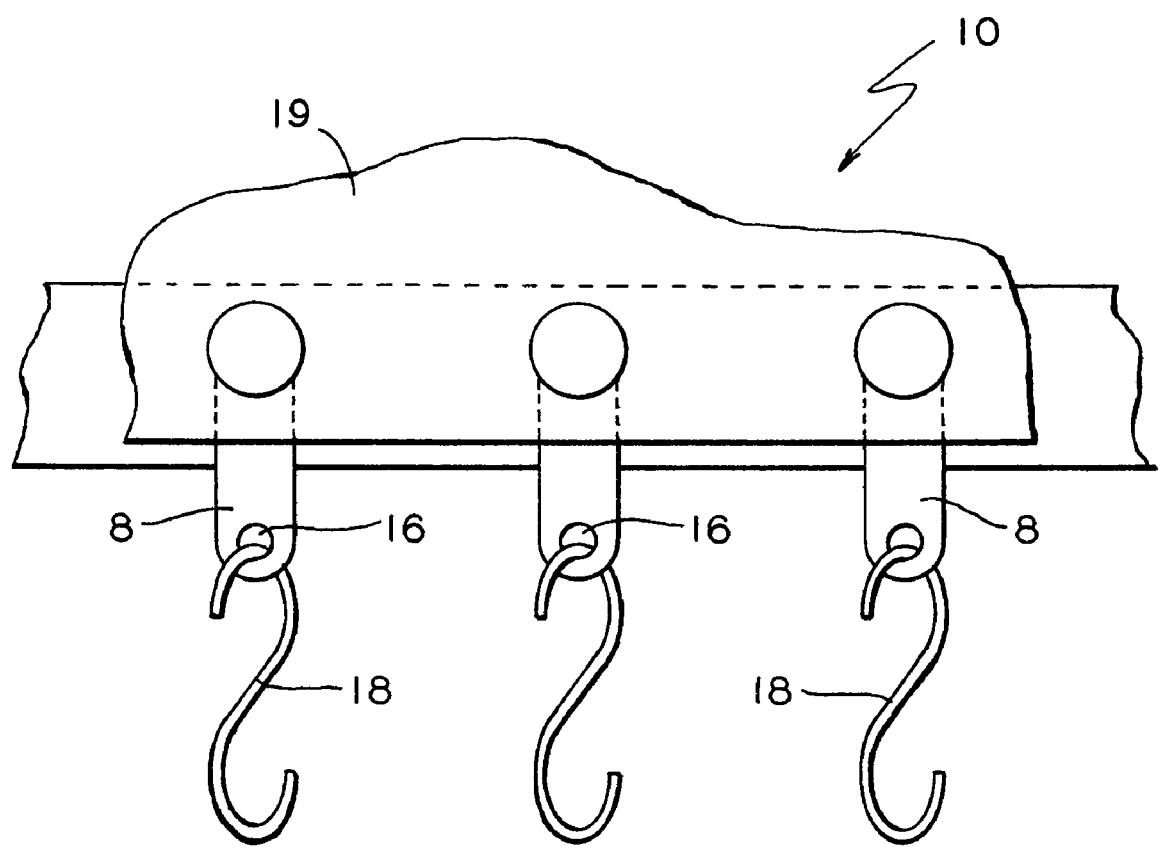
FIG. 4 is a front view of the apparatus showing a cover in place along with the additional storage means.

In one embodiment the strap like connector 8 includes a second aperture 16 formed therethrough closely adjacent a second end of said strap like connector 8. Such aperture 16 can be used to hold an S-hook 18 or hanger 18 as is shown of FIG. 4, thereby providing a means for storing items and keep them handy. Thus, the "double snap" apparatus 10 of the present invention provides a double use for snaps that are presently in place on a boat. In this embodiment it is presently preferred that such strap like material 8 is an elastomer.

Figure 5:
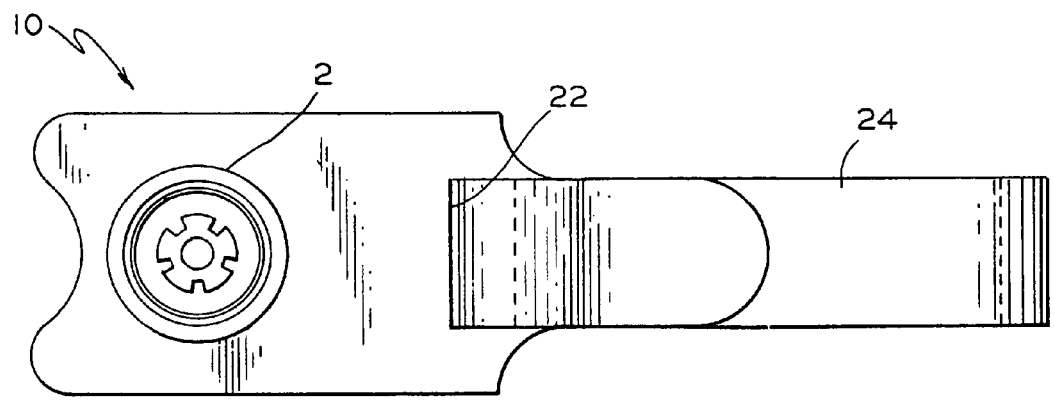
FIG. 5 is top view of the apparatus invention according to an alternate embodiment of the invention.

In an alternate embodiment of the invention such strap like connector 24 is formed from a hook and loop material. This strap like connector is evident in FIGS. 5, 6 and 7. In this embodiment such strap like connector 24 has a second aperture 22 closely adjacent the first end where the strap like connector 24 extends outwardly from the apparatus 10.

The apparatus 10 provides an additional use in that when used in conjunction with recreational boats further provides an air gap between such canvas cover 19 and a predetermined member such canvas cover 19 is to be attached.

Figure 6:
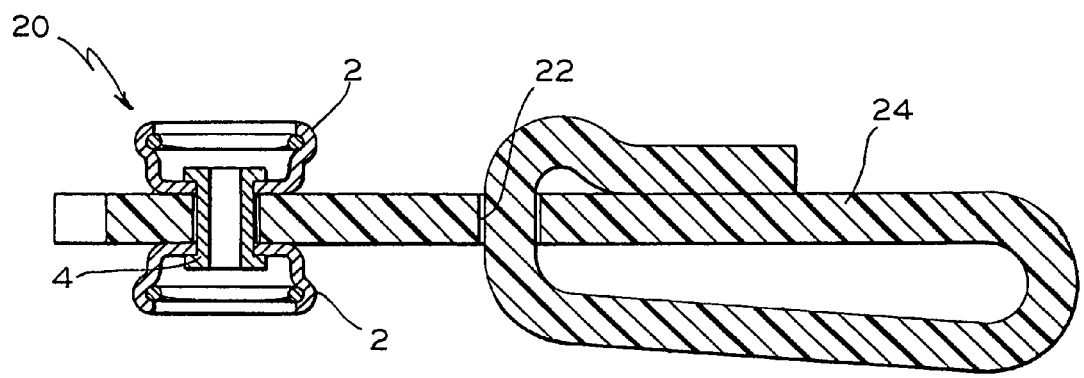
FIG. 6 is a cross sectional view of the apparatus of the apparatus according to an alternate embodiment of the invention.

In an other embodiment of the invention such apparatus 20 as seen in FIG. 6 is similar to apparatus 10 except that instead of having a male portion 12 on one end and a female portion 2 on the other end as is found on apparatus 10 such apparatus 20 has a female member 2 on both ends of the apparatus.

Figure 7:
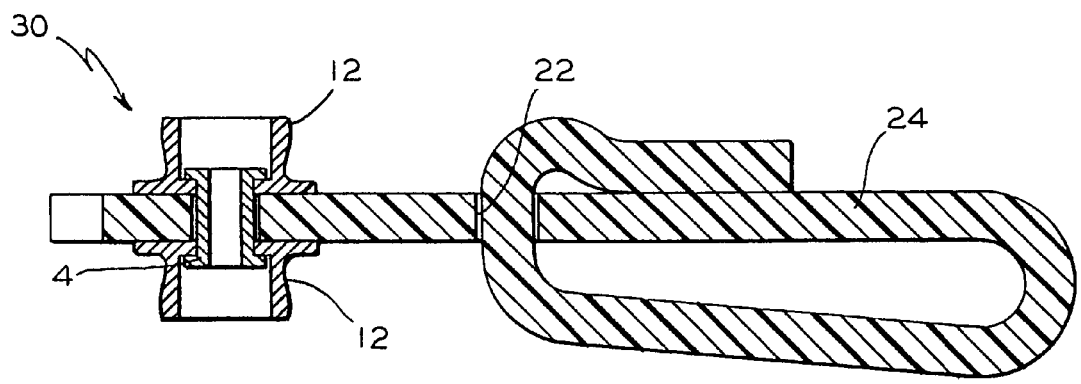
FIG. 7 is a cross sectional view of of the apparatus according to yet another alternate embodiment of the invention.

In yet another embodiment of the invention such apparatus 30 as seen in FIG. 7 is also similar to apparatus 10 except that instead of having a male portion 12 on one end and a female portion 2 on the other end as is found on apparatus 10 such apparatus 20 has a male member 12 on both ends of the apparatus.

The last two embodiments are used for specific applications and are not as universally applicable as is the embodiment of apparatus 10.

While a presently preferred embodiment and alternate embodiments of the present invention have been described in detail above, it should be understood that various other adaptations and/or modifications of the invention can be made by those persons who are particularly skilled in the art without departing from either the spirit of the invention or the scope of the appended claims.

I claim:

1. An apparatus for providing at least one securing means in conjunction with one of a male and a female portion of a snap already in place, said apparatus comprising:
   (a) a first member having an opposite one of a male and a female portion of a snap for engagement with such one of a male and a female portion of such snap already in place;
   (b) an intermediate segment engageable with an inner part of said one of said male and female portion of said first member, said intermediate segment having a projection extending outwardly therefrom;
   (c) a strap like connector having a first aperture in a first end engageable with said projection of said intermediate segment, said strap like connector extending outwardly therefrom;
   (d) a hook disposed in a second aperture of said strap like connector; and
   (e) a second member having an opposite one of a male and a female portion of a snap as said first member, said second member secured to an end of said projection of said intermediate segment.

2. The apparatus, according to claim 1, wherein said one of said male and said female portion of said second member is secured to said end of said projection by means of peening said end of said projection of said intermediate segment.

3. The apparatus, according to claim 1, wherein said strap like connector is a flexible elastomer.

4. The apparatus, according to claim 3, wherein said flexible elastomer includes said aperture formed therethrough closely adjacent a second end of said flexible elastomer.

5. The apparatus, according to claim 1, wherein said apparatus when used in conjunction with recreational boats further provides an air gap between a canvas cover and a predetermined member such canvas cover is to be attached.

* * * * *